(12) United States Patent
Harrison et al.

(10) Patent No.: US 6,722,394 B2
(45) Date of Patent: Apr. 20, 2004

(54) INDUSTRIAL TEXTILES ASSEMBLED FROM PRE-CRIMPED COMPONENTS

(75) Inventors: James Harrison, Kanata (CA); Marc P. Despault, Ottawa (CA)

(73) Assignee: Asten Johnson, Inc., Charleston, SC (US)

( * ) Notice: Subject to any disclaimer, the term of this patent is extended or adjusted under 35 U.S.C. 154(b) by 314 days.

(21) Appl. No.: 09/824,829

(22) Filed: Apr. 3, 2001

(65) Prior Publication Data

US 2002/0060056 A1 May 23, 2002

Related U.S. Application Data

(60) Provisional application No. 60/194,163, filed on Apr. 3, 2000, and provisional application No. 60/268,215, filed on Feb. 12, 2001.

(51) Int. Cl.$^7$ .............................................. D03D 15/00
(52) U.S. Cl. ........................... 139/383 R; 139/426 R; 139/383 A; 442/193
(58) Field of Search ................... 139/426 R, 383 A, 139/383 R; 442/193, 185, 186

(56) References Cited

U.S. PATENT DOCUMENTS

| | | | |
|---|---|---|---|
| 2,377,810 A | 6/1945 | Robbins | |
| 2,800,170 A | 7/1957 | Richardson | |
| 3,238,594 A | 3/1966 | Schuster | |
| 3,308,856 A | 3/1967 | Ploss | |
| 3,567,569 A | 3/1971 | Ono et al. | |
| 3,622,415 A | 11/1971 | Kunsmann | |
| 3,723,240 A | 3/1973 | Skochdopole et al. | |
| 3,836,416 A | 9/1974 | Ropiequet | |
| 4,054,993 A | 10/1977 | Kamp et al. | |
| 4,123,022 A | 10/1978 | Dutt et al. | |
| 4,186,239 A | 1/1980 | Mize et al. | |
| 4,229,501 A | 10/1980 | Kern | |
| 4,349,198 A | 9/1982 | Stelck | |
| 4,395,308 A | 7/1983 | Dawes | |
| 4,410,015 A | 10/1983 | Koller et al. | |
| 4,415,625 A | 11/1983 | Borel | |
| 4,529,013 A | 7/1985 | Miller | |
| 4,581,794 A | 4/1986 | Oldroyd et al. | |
| 4,585,487 A | 4/1986 | Destree et al. | |
| 4,661,404 A | 4/1987 | Black | |
| 4,846,231 A | 7/1989 | Penven | |
| 4,861,660 A | 8/1989 | Ishii | |
| 4,974,302 A | 12/1990 | Nabulon | |
| 5,187,845 A | 2/1993 | Duffy et al. | |
| 5,220,774 A | 6/1993 | Harbeke et al. | |
| 5,268,076 A | 12/1993 | Best et al. | |
| 5,690,150 A | * 11/1997 | Huey et al. ............. | 139/426 R |
| 5,968,651 A | 10/1999 | De Vos et al. | |
| 5,989,683 A | 11/1999 | Haddock et al. | |
| 6,045,884 A | 4/2000 | Hess et al. | |
| 6,045,911 A | 4/2000 | Legrand et al. | |
| 6,058,541 A | 5/2000 | Masterman et al. | |
| 6,079,087 A | 6/2000 | Cansler | |
| 6,088,891 A | 7/2000 | Cohrt et al. | |
| 6,311,466 B1 | 11/2001 | De Vos et al. | |

FOREIGN PATENT DOCUMENTS

| | | | | |
|---|---|---|---|---|
| EP | 0130106 A1 | 1/1985 | | |
| EP | 0 130 106 | 1/1985 | | |
| FR | EP-130106 | * 1/1985 | ............. | B01B/1/46 |
| FR | 1529842 | 5/1997 | | |
| JP | 10017009 | 1/1998 | | |
| WO | WO9719584 | 6/1997 | | |

* cited by examiner

*Primary Examiner*—John J. Calvert
*Assistant Examiner*—Robert H. Muromoto, Jr.
(74) *Attorney, Agent, or Firm*—Volpe and Koenig, P.C.

(57) ABSTRACT

An industrial textile, such as a papermaking fabric, including a plurality of pre-crimped thermoplastic components. The pre-crimped components include dimensioned indentations that are complementary in size and shape to the components with which they are assembled. Methods of manufacture of the components and assembly of the textiles are also provided.

20 Claims, 12 Drawing Sheets

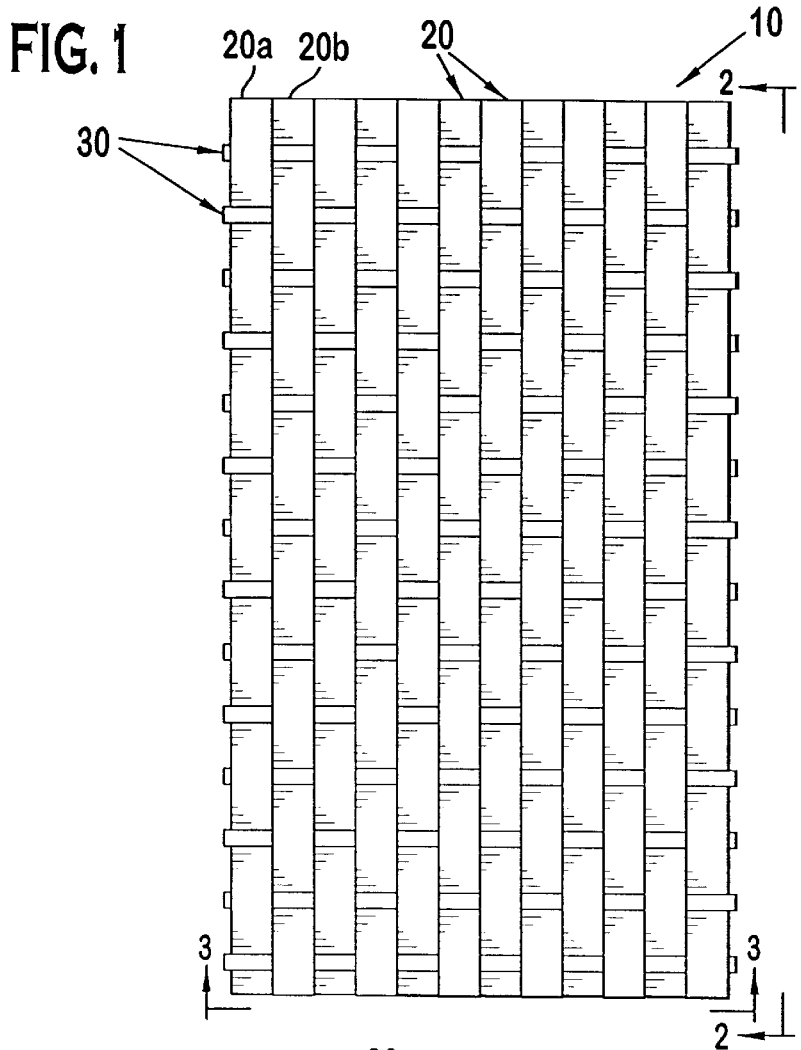
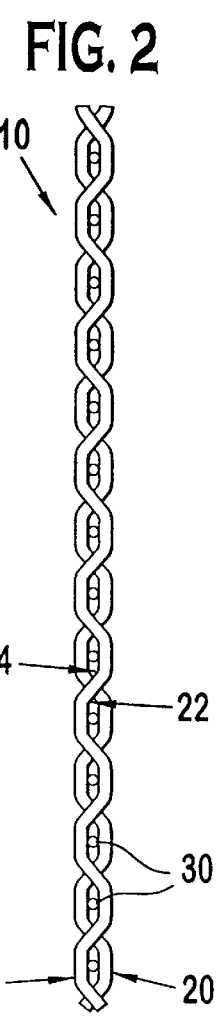
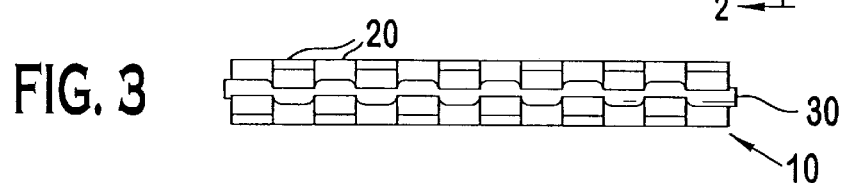
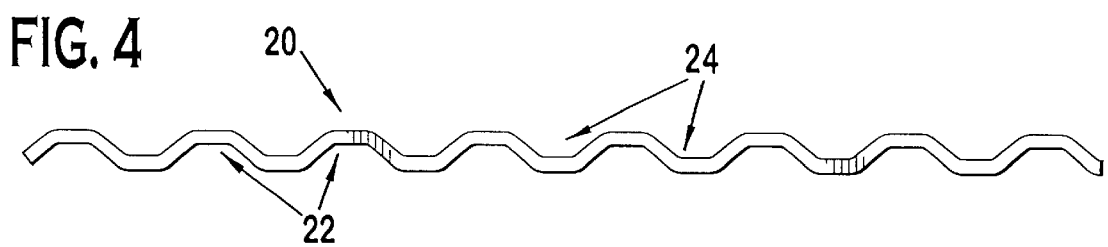
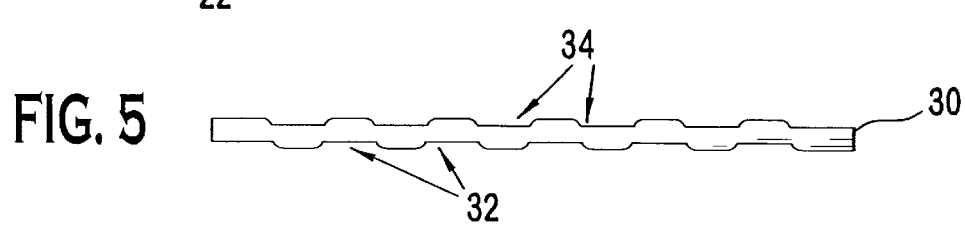

FIG. 19
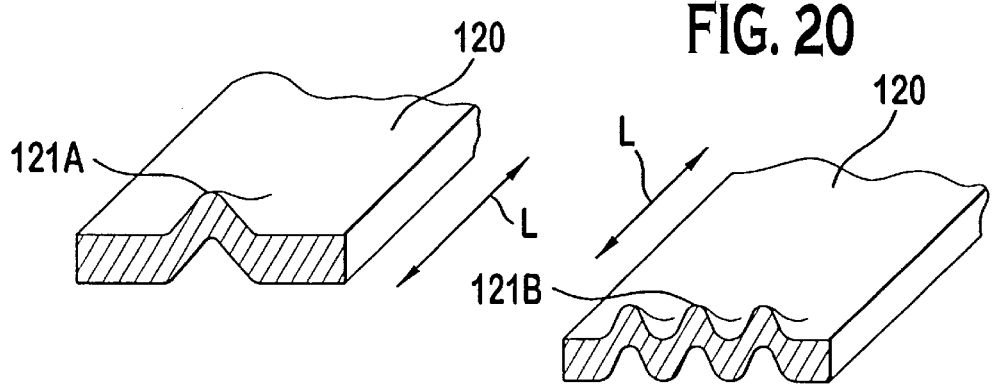
FIG. 20
FIG. 21
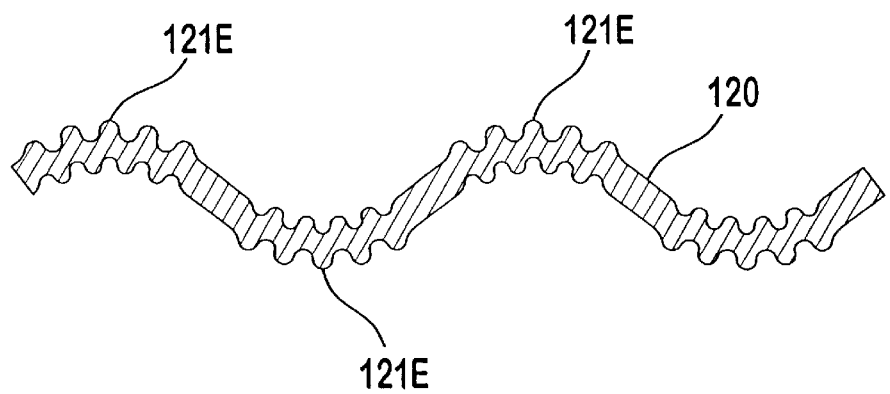
FIG. 22
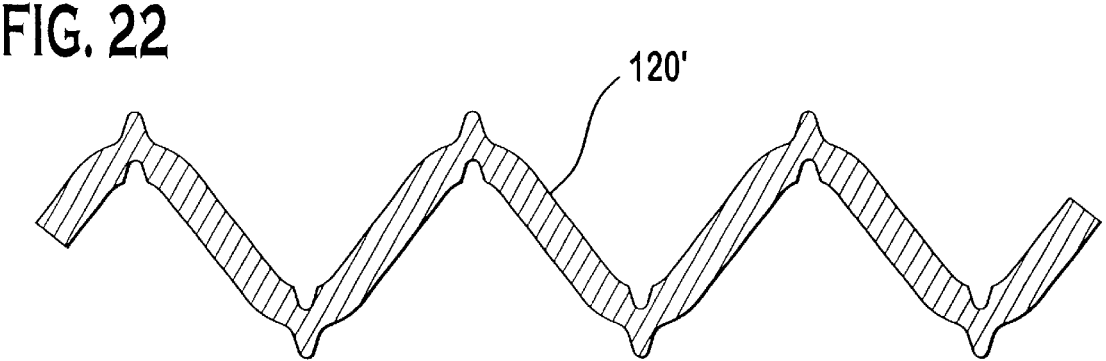

INDUSTRIAL TEXTILES ASSEMBLED FROM PRE-CRIMPED COMPONENTS

This Application claims benefit of U.S. provisional app. No. 60/194,163 filed Apr. 3, 2000 which claims benefit of 60/268,215 filed Feb. 12, 2001.

BACKGROUND

The present invention relates to industrial textiles. More particularly, the present invention relates to industrial textiles assembled from a plurality of pre-crimped components, methods of manufacturing those components and methods of assembling the textiles.

Industrial textiles, such as papermaking, filtration and like fabrics, are commonly assembled from a plurality of thermoplastic monofilament or multifilament yarns. Due to the size of these textiles, the preferred method of assembly is generally to interweave the yarns as warp and weft materials in an industrial loom or similar device. Other assembly methods are also known and used. For example, it is known to assemble papermaking fabrics and conveying belts from a multiplicity of helical coils interdigitated and interconnected by means of inserted pintles or hinge yarns. See U.S. Pat. No. 4,528,236 (Finn et al.). It has also been proposed to manufacture industrial textiles built upon a polymeric grid-like material into which reinforcing yarns are embedded to increase the strength of the grid. See U.S. Pat. No. 4,740,409 (Lefkowitz). It is also known to assemble industrial textiles from one or more strips of woven, knit or nonwoven fabric layers which are spirally wound one over the other and then interconnected by various means. See U.S. Pat. No. 5,268,076 (Best et al.) It has also been more recently proposed, in U.S. Pat. No. 5,879,777 (Shipley) which is commonly assigned to the present assignee, to assemble industrial textiles from smaller strips or panels which include an integral joining means, such as hook-and-loop type fasteners.

Woven fabrics are commonly heat set to fix the component yarns prior to use and permanently set crimp at locations where two or more yarns cross over one another (commonly referred to as "crossover points"), and, thereby, stabilize the fabric. The amount of crimp imparted to the yarns at a crossover point is dependent on several factors, including: the tension applied to the warp yarns during weaving, tension applied during heatsetting, the so-called "beat-up" capability of the loom, and the physical characteristics of the yarns (i.e.: their size and material composition).

Generally speaking, relatively larger yarns must be woven at higher weaving tensions than relatively smaller yarns in order to impart the desired crimp during beat-up. The degree to which either warp or weft yarns are crimped can be controlled, to an extent, by the weaver in accordance with the end use requirements of the fabric. However, the physical limitations of this control will be dictated by the physical properties of the warp and weft yarns and the beat-up capability of the loom. For example, in experiments conducted to provide a 100% warp fill papermaking dryer fabric woven using 0.8×1.2 mm rectangular PET weft yarns and 0.33×0.66 mm PET warp yarns at tensions between 550 and 1000 kg/m, it was observed that virtually no crimp was imparted to the large weft yarns following weaving and heatsetting. The fabric had minimal interlocking at the crossover points and was slack and exhibited poor dimensional stability.

In the manufacture of industrial textiles, particularly by weaving, it is frequently desirable to use relatively large diameter yarns, for example yarns having a diameter or thickness of at least 0.8 mm, in either, or both, the warp and weft directions. Large diameter yarns, particularly when used as the weft material in the weaving of papermaking press or dryer fabrics, offer several advantages. Such fabrics can be woven at a low "knocking" (number of weft yarns per unit of fabric length) so as to provide a fabric having a relatively high air permeability (economy of manufacture). The resulting fabrics are very stiff in the cross-machine direction, but remain flexible in the machine direction, which is highly desirable in certain applications. It may also be desirable to produce a textile product having a relatively low permeability to air but a high drainage rate for other fluids. However, as previously noted, as the size of the warp or weft yarns increase, the dimensional stability of fabrics in which they are incorporated tends to decrease due to the difficulty of imparting sufficient crimp to the yarns during weaving and/or heat setting. A degree of crimp is necessary to interlock the yarns and stabilize the fabric.

It is also desirable in other applications, such as producing woven or braided strapping or sleeving, to utilize larger diameter yarns or yarns made from heat and/or moisture resistant materials. However, due to the difficulties encountered when attempting to impart sufficient crimp to these yarns during weaving or braiding so as to provide a dimensionally stable textile product, it is frequently not possible to make the desired article. This is also true for brittle or inflexible materials, such as (polyphenylene sulfide) PPS, that has many desired properties, but is not generally amenable to being woven or braided because the yarns tend to crack and break at temperatures normally used for these assembly processes.

It is also necessary in some applications of industrial fabrics, such as papermaking fabrics, to insert stuffer yarns into the open weave to further reduce fabric permeability. However, it is difficult to insert more than one stuffer in a given channel or path through the woven fabric. Often, it is desirable to insert two or more stuffer yarns, which can more easily conform to the available space in the weave, and which could also be made of different materials, rather than a single larger stuffer yarn.

It may also be desirable to impart certain surface characteristics to the belting or fabric so as to emboss or transfer a texture to the product being conveyed. This can be done by applying a liquid polymeric resin to a textile substrate and then curving it provide the desired surface texture. It may also be done by utilizing a weave pattern which creates relatively large floats of the warp and/or weft yarns, leaving empty "pockets" in between. However both methods are relatively costly and, in the former case, requiring an extra process step (or steps) to complete.

It would also be desirable to form belting from polymeric materials, which could be used in various applications, such as tire reinforcement belting, rubber hose reinforcement, or tubing, which has high strength and stability. It is believed that such polymeric belting could be more easily bonded to by rubber compounds, and can provide economy of manufacture over known materials, such as steel belting used in tires.

A need therefore exists for an industrial textile and/or weaving or braiding components for such textiles or industrial articles, such as yarns or strips, which are pre-crimped or thermoformed so as to impart a plurality of dimensioned indentations sized and shaped so as to be substantially complementary to the cross-sectional size and shape of the components with which they will be assembled or mated.

Pre-crimping or thermoforming textile components prior to assembly makes it possible to assemble dimensionally stable industrial textiles from yarns or components previously impractical for such applications due to weaving or heat setting difficulties associated with them.

SUMMARY

The present invention relates to industrial textiles that are assembled, at least in part, from a plurality of pre-crimped polymeric components, particularly yarns, strips and the like. Crimp is imparted to the components so as to provide dimensioned indentations that will be generally complementary, in shape and size, to the components with which they are to be assembled or mated. The textiles may be assembled by weaving, braiding or a similar process such as mechanical interlacing.

BRIEF DESCRIPTION OF THE DRAWINGS

FIG. 1 is a top plan view of a textile made in accordance with the present invention.

FIG. 2 is a side elevational view along line 2—2 of FIG. 1.

FIG. 3 is a side elevational view along line 3—3 of FIG. 1.

FIG. 4 is a side elevational view of a pre-crimped component in accordance with the present invention.

FIG. 5 is a side elevational view of another pre-crimped component in accordance with the present invention.

FIG. 19 is an enlarged perspective view, partially in section, showing a texture feature on a crimped component.

FIG. 20 is an enlarged perspective view similar to FIG. 14, showing an alternate texture feature on a crimped component.

FIG. 21 is an enlarged, longitudinal cross-sectional view through a crimped component.

FIG. 22 is a view similar to FIG. 21 of an alternate embodiment of a crimped component.

DETAILED DESCRIPTION OF THE PREFERRED EMBODIMENTS

Figure 6:
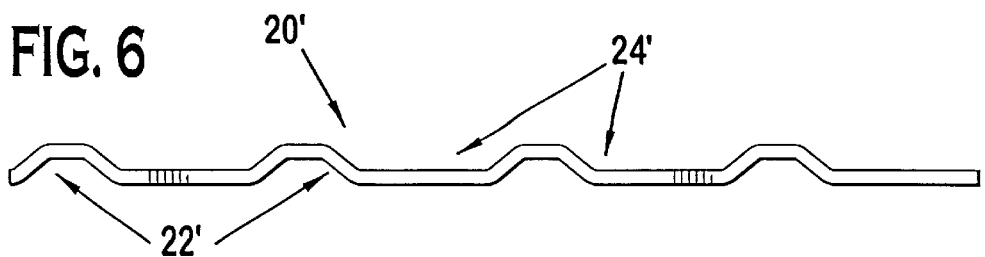
FIG. 6 is a side elevational view of another pre-crimped component in accordance with the present invention.

The present invention will be described with reference to the accompanying drawing figures where like numerals represent like elements throughout. As used herein, the term "component" encompasses monofilaments, multifilaments, strips slit from film or other similar textile components whose length dimension is much greater than either their height or width. The term "industrial textile" includes both planar structures, such as an assembly of components whose width and length is much greater than its thickness, tubular sleeves, braided structures, and/or assemblies of same. The term "crimp" refers to the waviness or distortion of a component from a common center as is known in the art. Crimp is most commonly imparted to a component by interlacing it with a second component during the assembly of a textile, such as by weaving or knitting. It is well known that crimp can be developed in components by a variety of specific treatments. The term "pre-crimped" refers to a treatment which imparts a desired crimp to a component prior to its incorporation into a textile product such as an industrial fabric. The term "thermoforming" relates to a process for imparting a specific distortion to a thermoplastic component by thermal or mechanical treatment; for example, by passing the components through chilled or heated gears, rollers or plates so as to permanently deform them in a desired manner. As used herein, both pre-crimping and thermoforming impart specifically dimensioned indentations to the components allowing them to be interlocked with a desired fit. The terms "longitudinal", "horizontal" and/or "cross-direction" are used herein only to distinguish the positioning of the components relative to one another and do not describe the orientations of the components in use or during manufacture, and textiles produced with such components are not limited based on these terms.

With reference to FIGS. 1–5, a textile 10 manufactured in accordance with the present invention will be described. The textile 10 comprises a plurality of longitudinal components 20 interlaced with a plurality of horizontal components 30. In the illustrated embodiment, the textile 10 is a single layer textile with the components 20, 30 interlaced according to an over one, under one pattern commonly referred to as a plain weave. If desired, the textile 10 may be formed as a multilayer textile in any desired weave pattern.

The longitudinal components 20 are illustrated in textile 10 as having a rectangular cross-section and the horizontal components 30 a circular cross-section. However, the components 20 and 30 can have any desired cross-section. Additionally, although each set of longitudinal components 20 and each set of horizontal components 30 has a constant configuration and weave pattern, such can be varied from component to component of a given set. For example, longitudinal components 20a and 20b in FIG. 1 may be of different sizes and may have different weave patterns. The only requirement with respect to the chosen configuration is that at least some of the horizontal components must be able to be inserted across the fabric width.

Referring to FIG. 4, the component 20 is pre-crimped such that it has alternating bottom side indentations 22 and top side indentations 24. Each indentation 22, 24 is configured to receive a complementary component 30 in accordance with the plain weave pattern of the textile 10. However, as shown in FIG. 6, the indentations 22', 24' may be of various sizes and may vary from the top side to the bottom side. The size and shape of each indentation will depend on the size and shape of the intended components 30 and the intended interlacing pattern of the textile. For example, the bottom side indentation 22' of component 20' in FIG. 6 may be sized to receive one horizontal component 30 while the top side indentation 24' is sized to receive four horizontal components 30. Such a component 20' may be intended for use, for example, in a textile having a five shed satin twill pattern.

Referring to FIG. 5, an illustrative horizontal component 30 is shown. The horizontal component 30 also has a plurality of bottom and top side indentations 32, 34. These indentations 32, 34 can also be formed prior to assembly of the textile 10. Alternatively, since the longitudinal components 20 are generally larger and the horizontal indentations 32, 34 tend not to be as pronounced, it is possible to assemble the textile 10 with pre-crimped longitudinal components 20 and uncrimped horizontal components 30. Upon heat setting, the larger longitudinal components 20 will generally impose sufficient force to create the desired horizontal indentations 32, 34.

Figure 7:
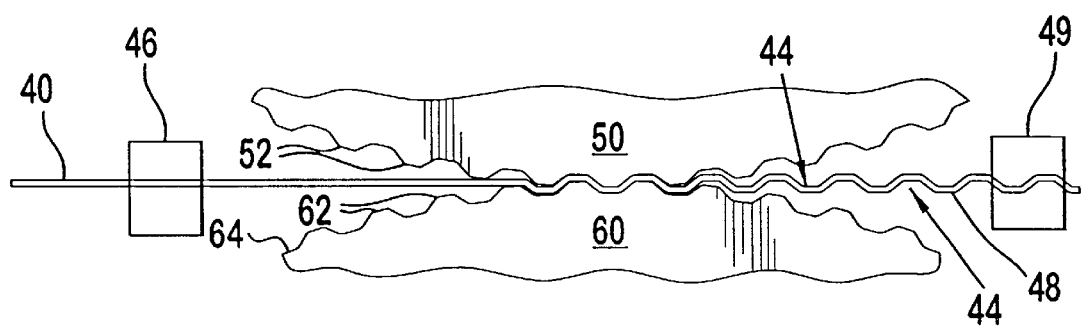
FIG. 7 illustrates a preferred method of manufacturing the component of FIG. 4.
Figure 8:
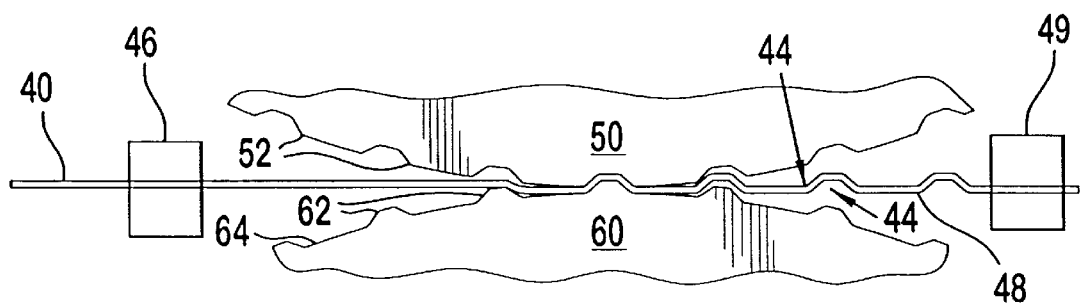
FIG. 8 illustrates a preferred method of manufacturing the component of FIG. 6.

The presently preferred method of forming pre-crimped components will be described with reference to FIGS. 7 and 8. Raw stock 40, such as uncrimped, polymeric yarns is passed through opposed forming gears 50, 60 having respective predetermined projections 52, 62 and recessions 54, 64. As illustrated in FIG. 8, the projections 52, 62 do not have to be identical on each gear 50, 60. However, the projections 52 on one gear 50 should complement the recessions 64 on the other gear 60. It is also possible that the projections 52 on a given gear 50 will vary in size and shape to permit formation of components having an asymmetric pattern. In addition to using opposed gears, various other assemblies, for example cams, embossing rolls, or crimping plates can be utilized.

Depending on the stock material, the size of the components and the desired indentation size, it may be desirable to heat the raw stock 40 to make it more pliable prior to passage through the crimping means. An appropriate temperature may be selected for each polymer with the stock 40 preferably heated to approximately the glass transition temperature of the polymer. For some polymers, for example, nylon, heating may not be necessary and/or desired. In the preferred embodiment, a heat source 46 is positioned proximate to the gears 50, 60 and controlled to provide a desired amount of heat. Generally, for the polymers of interest, a temperature of from about 50° C. to about 250° C. is appropriate. It will be recognized that more heat may be required for certain high temperature resistant materials. Various heat sources 46 can be used including a hot water bath, a conduction or convection oven, a microwave or infrared radiation. Alternatively, the gears 50, 60 may be heated, for example by using a cartridge heater or other suitable heat source, to heat the stock 40 as it is crimped. Alternatively, the stock 40 may be fed to the gears 50, 60 directly from the apparatus used for forming such, for example a spinnerette or extruder, in a semi-heated state where it may or may not require additional heat.

If heated, the crimped component 48 is preferably readily cooled by a suitable means to assure that the size and shape of the imparted crimps is retained. In one embodiment, the heated crimped component 48 is passed through a cold water bath or vortex chiller 49. Alternatively, the primary gears 50, 60, or a supplemental set of gears (not shown) may be chilled, for example by a vortex chiller, to cool the exiting component 48. If a second, cooled gear assembly or the like is used, it will have projections and recesses complementary to those of the first gear and will be synchronized therewith. In some applications, rapid cooling may not be necessary and the component may be allowed to stand and cool naturally.

The finished crimped component 48 is then either coiled into a suitable package for later use, or fed directly to the loom or other textile assembly apparatus for immediate use in textile assembly.

In a first method of manufacture of a textile in accordance with the present invention, the components are supplied to a textile loom and interwoven in a weaving process. In feeding the components to the loom, each must be properly aligned such that warp and weft yarns can be interlaced in a desired manner, with the respective warp and weft indentations and yarns properly aligned. The warp components are preferably pre-crimped such that the loom will not have to use force to define positions for the weft components, as is necessary with uncrimped warp yarns. Instead, the loom will only have to insert the weft components into defined indentations. This will greatly reduce the required beat-up by the loom and will permit larger sized warp yarns to be utilized.

Figure 9:
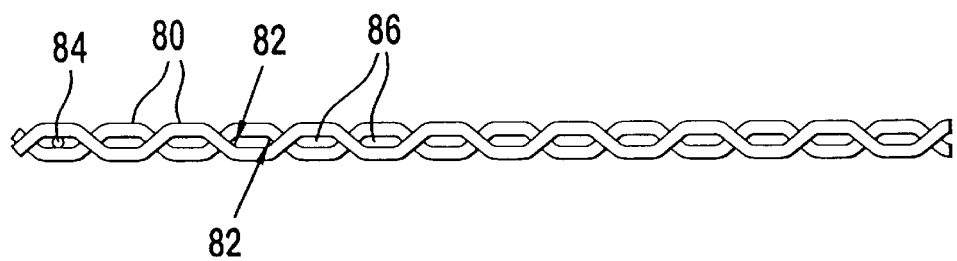
FIG. 9 illustrates a method of assembling the textile of FIG. 1.

An alternate assembly method will be described with reference to FIG. 9. A plurality of machine direction components 80 are aligned in a desired configuration with the aligned indentations 82 defining channels 86 across the textile. Cross-machine components 84 are then inserted into each of the channels 86, in a manner similar to that employed with the formation of spiral fabrics, thereby interlocking the machine direction components 80. A spiral fabric may also be formed by aligning the spiral components and inserting pre-crimped stuffer components have indentations spaced to coincide with the pitch of the spirals. The pre-crimped components increase the stability of the fabric and reduce the required amount of material, thereby reducing the mass of the fabric.

Joining of the ends of the textile 10 may also be simplified by the pre-crimped components 20. One method of joining textile ends includes the steps of removing cross-machine direction yarns from each end of the textile to define a fringe at each end, cutting back some of the fringe yarns at each end of the textile, and reweaving the two fringes with replacement cross-machine direction yarns to join the textile ends. See U.S. Pat. No. 3,622,415 (Kunsman). Another method also forms a fringe at each end, but instead forms seam loops at each end of the textile by back weaving the fringe yarns at each end of the textile. Such seams may or may not include coil members. See U.S. Pat. Nos. 4,026,331 (Lees et al.) and 5,488,976 (Lorenz et al.). In yet another method, a fringe is formed at each end and preformed loop components are interwoven with the fringe. See U.S. Pat. No. 4,123,022 (Dutt et al.) In each of these methods, the fringe yarns, whether rewoven or back woven, generally must be crimped before such process can be performed to ensure proper alignment. As such, current textiles must be heat set to impart the necessary crimp in the yarns, and only after this initial heat set, can the cross-machine direction yarns be removed to create the fringe. After the fringe yarns are rewoven or back woven to form seam loops, the textile may require a second heat set to finalize the textile.

Figure 10:
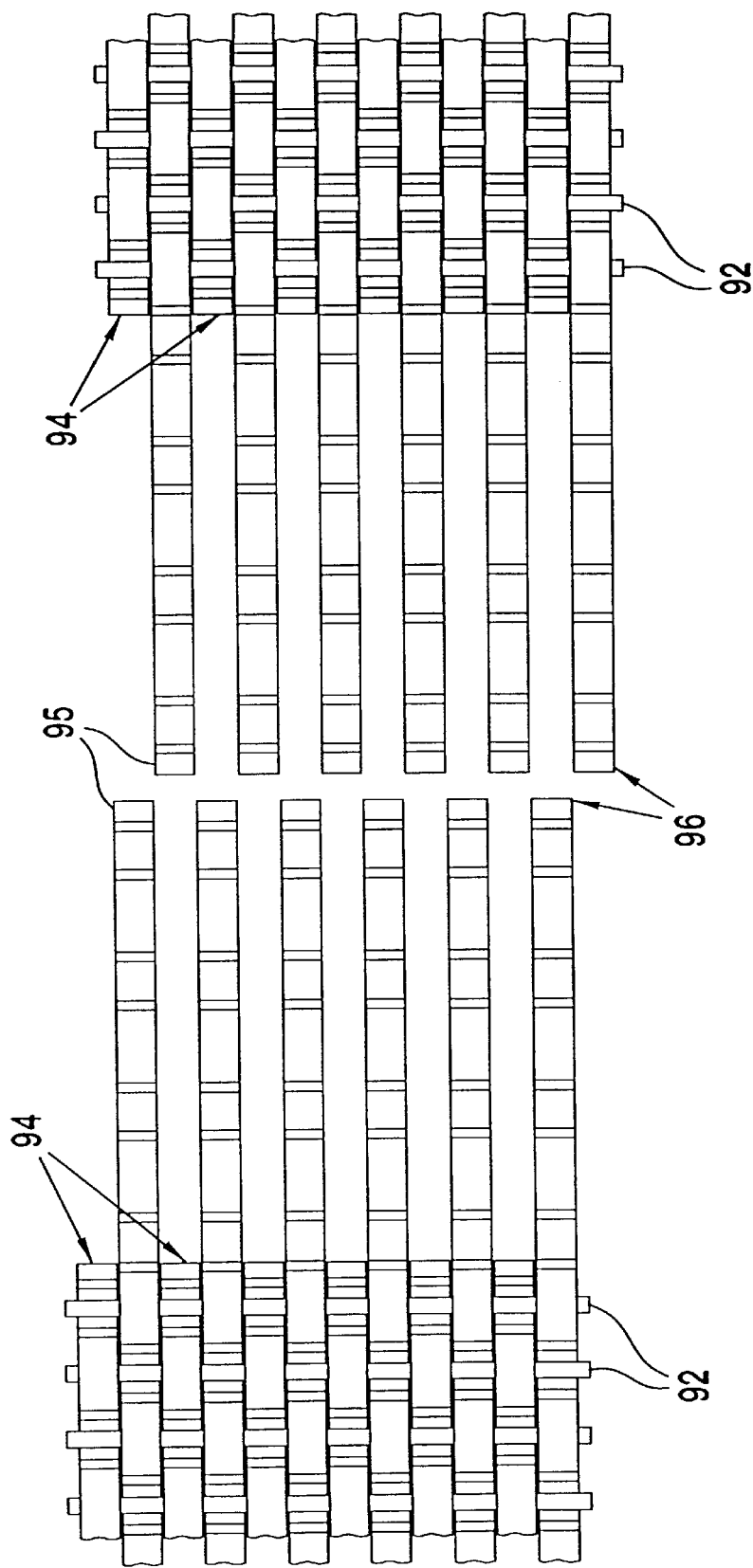
FIG. 10 is a top plan view illustrating two ends of a textile configured for joining.
Figure 11:
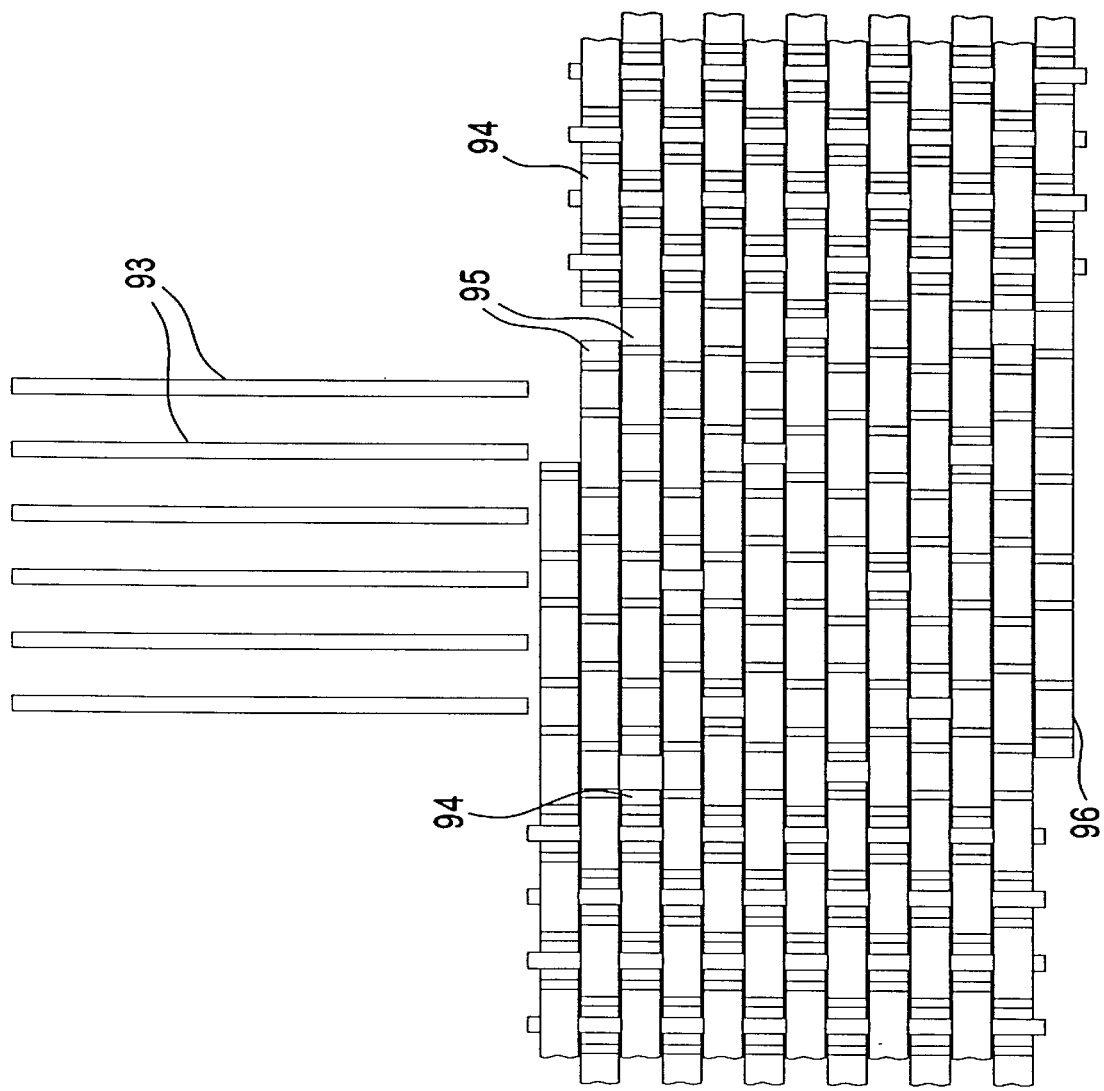
FIG. 11 is a top plan view illustrating the two ends of the textile of FIG. 10 aligned for joining.
Figure 12:
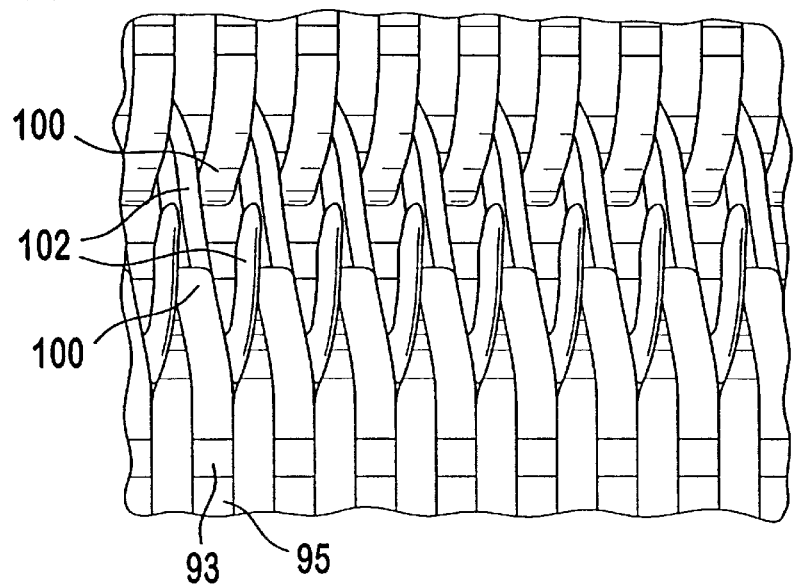
FIG. 12 is a photomicrograph showing two ends of a textile joined as a coil seam.
Figure 13:
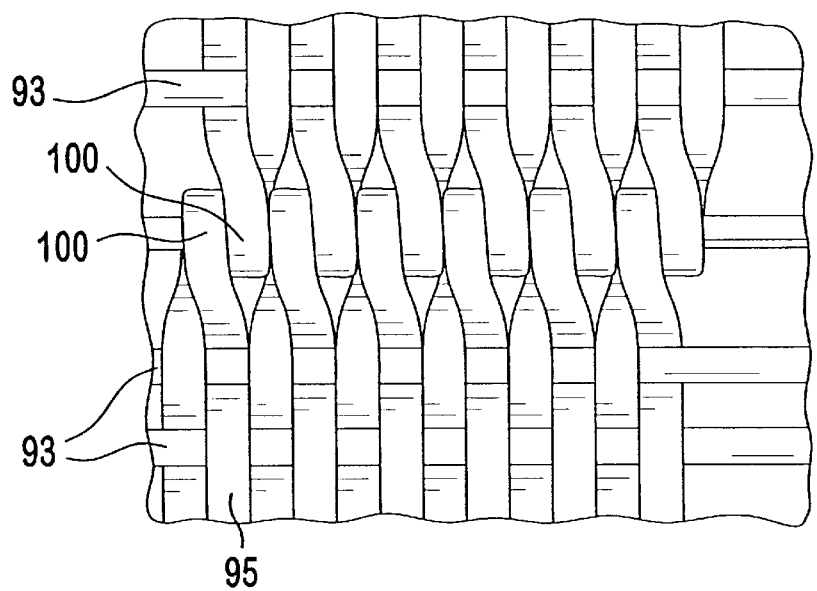
FIG. 13 is a photomicrograph showing two ends of a textile joined by pin seams.
Figure 14:
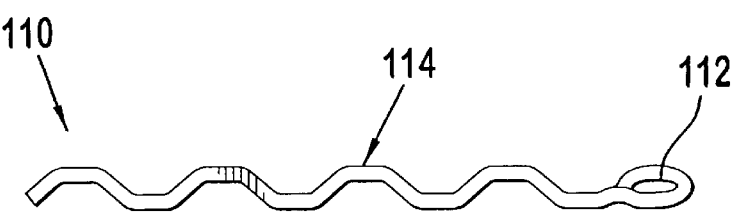
FIG. 14 is a plan view of a pre-crimped loop component in accordance with the present invention.

With the pre-crimped components of the present invention, the first heat setting can be eliminated. Referring to FIG. 10, the cross-machine direction yarns 92 can be removed and select machine direction components 94 cut back to leave the opposed fringes 96. The extending components 95, already having the desired crimp, can the be rewoven or back woven. Referring to FIG. 11, the opposed fringes 96 can be aligned and the replacement cross-machine direction yarns 93 easily inserted. In such a joining method, it is preferable to fluctuate the cut backs such that the abutting locations are staggered. Referring to FIGS. 12 and 13, loop seams 100, with and without spirals 102 respectively, can be formed by back weaving the extending, pre-crimped components 95. The pre-crimped components 95 easily align with the cross-machine components 93 during back weaving. Referring to FIG. 14, an illustrative preformed loop component 110 having a eye portion 112 and a crimped portion 114 is shown. The crimped portions 114 complement the crimp of the fringe yarns 96 and are aligned therewith the and rewoven to be secured to the textile ends. It again may be desirable to fluctuate the length of the cut backs and the crimped portions 114 to achieve a staggered effect. Other seaming methods, for example, attaching a molded seam, may also be employed.

Figure 15:
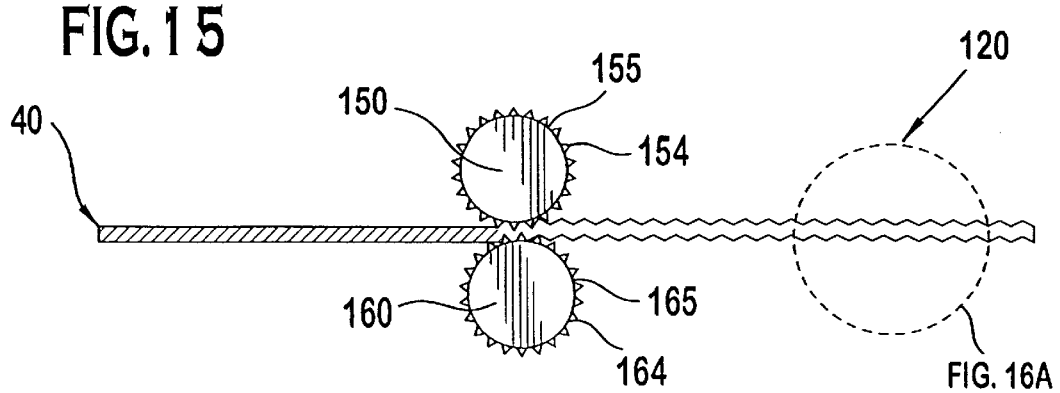
FIG. 15 is an elevational view of a crimping arrangement for forming crimped components with a textured surface.
Figure 17:
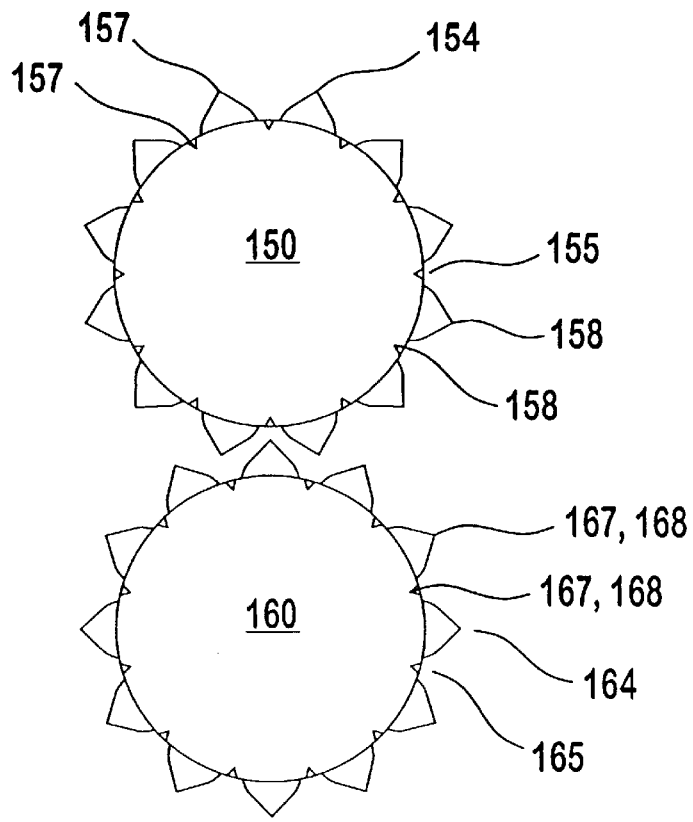
FIG. 17 is an enlarged view of the textured crimping rolls of FIG. 10.

Referring now to FIG. 15, a crimping arrangement for forming crimped components 120 with a textured surface is provided. This arrangement is shown in greater detail in FIG. 17. The crimping arrangement includes crimping gears 150, 160 which are arranged to crimp raw stock 40 which is fed therebetween. The teeth 154 on the crimping gear 150 mesh with the recesses 165 on the opposing gear 160, and the teeth 164 on the gear 160 mesh with the opposing recesses 155 of the gear 150. At least one of the teeth 154, 164 and the recesses 155, 165 of the gears include additional texture forming features, such as texture forming grooves 157, 167 and bumps 158, 168. Preferably, complementary grooves and bumps are provided on the opposing complementary surfaces of the teeth 154, 164 and recesses 155, 165. However, it will be recognized by those skilled in the art from the present disclosure that only either a groove or bump, or both could be provided on one or more of the teeth or recesses of one or both gears 150, 160, depending on the texture effect that is desired.

Figure 16A:
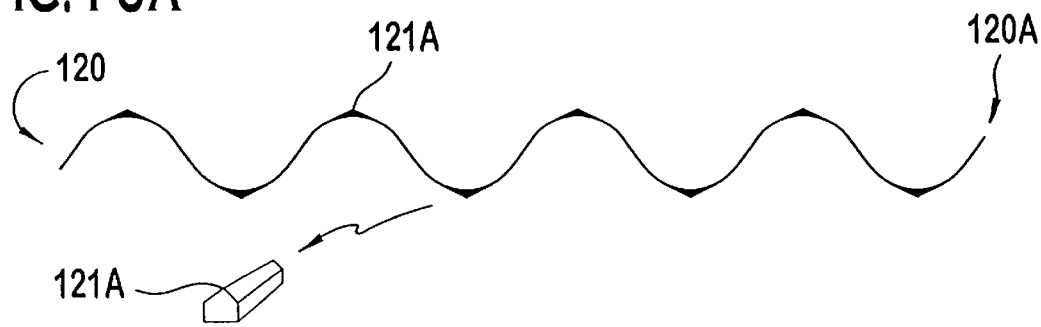
FIG. 16A is an enlarged view of a first embodiment of a crimped component with a textured surface.
Figure 16B:
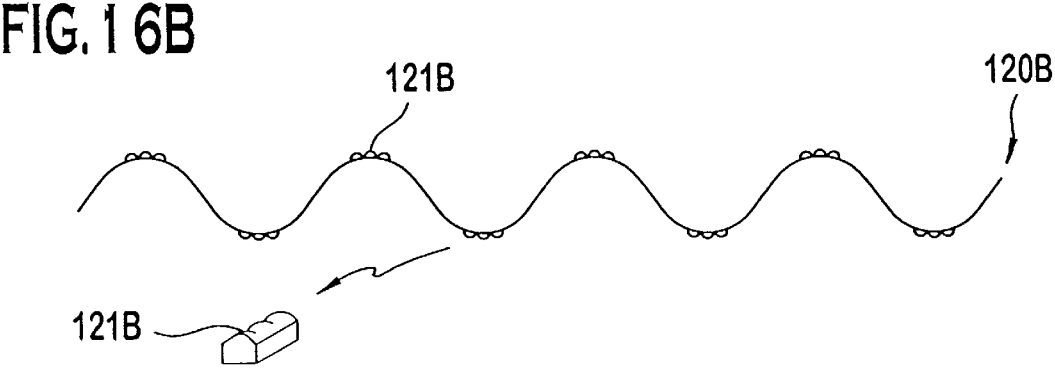
FIG. 16B is an enlarged view of a second embodiment of a crimped component with a textured surface.
Figure 16C:
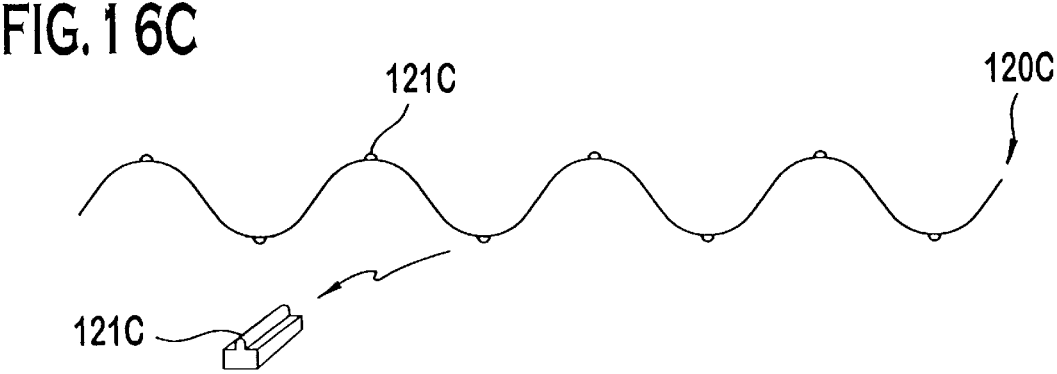
FIG. 16C is an enlarged view of a third embodiment of a crimped component with a textured surface.

As shown in FIG. 16A, the pre-crimped, textured component 120A may be formed with a longitudinally oriented fin 121A on the outer portion of each crimp. This could be done by providing grooves 157, 167 only in the recesses 155, 165 of each of the gears 150, 160, and by adjusting the spacing between the gears 150, 160 to cause the raw stock 40 to extrude or form into the grooves 157, 167. This is preferably done at elevated temperature, as discussed above in connection with the pre-crimping of the raw stock 40. Alternate forms of texturing are shown in FIGS. 16B and 16C for pre-crimped components 120B and 120C. The textured, pre-crimped component 120B includes texturing in the form of a plurality of small bumps 121B, and the textured, pre-crimped component 120C includes texturing in the form of a single nipple or protrusion that may appear on both sides, or only on one side of the component, analogously to the fin 121A of FIG. 16A. While several examples of texturing have been illustrated, it will be recognized by those skilled in the art from the present disclosure that other types of texturing could be provided, on one or both sides of the pre-crimped component 120.

Figure 18:
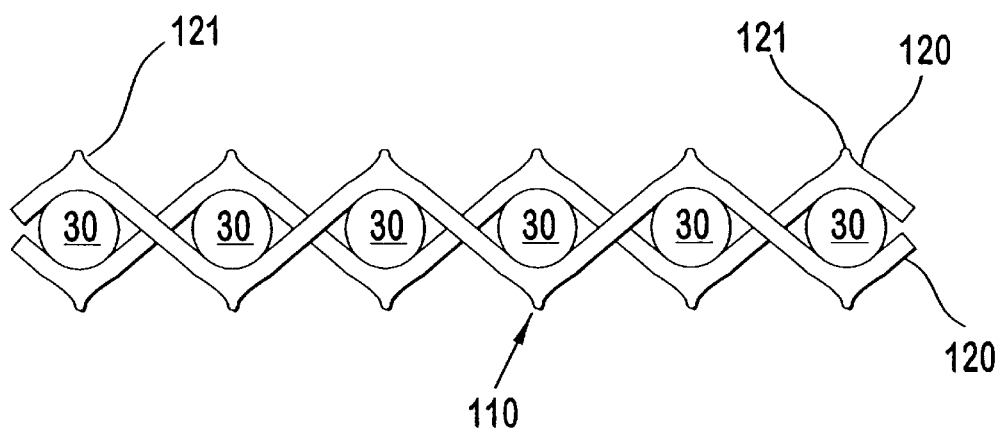
FIG. 18 is a side elevational view of an article assembled using a textured crimped component.

Referring now to FIG. 18, a side elevational view similar to FIG. 2 is shown of an article 110 assembled utilizing the textured, pre-crimped components 120 which have been interconnected by insertion of horizontal or cross-direction components 30 into the channels formed by the crimp indentations. This can be done in a flat or endless weaving process, or similar yarn insertion and indexing process so as to form a woven fabric or belt, as discussed above, or by assembling the pre-crimped components 120 so that their indentations form channels across the width of the textile 110 through which the horizontal or cross-direction components 30 may be inserted.

FIGS. 19 and 20 illustrate the formation of the longitudinal texturing in the pre-crimped components 120A and 120B. The longitudinal direction is indicated by the arrow L. The textured portion 121A in FIG. 19 has a generally smooth ramping up and down from the highest point in both the longitudinal and cross directions, with the textured portion only protruding in one direction. The textured portion 121B in FIG. 20 illustrates a plurality of generally smooth peaks and valleys on each side of the pre-crimped component 120. As shown in FIG. 21, these texture forming peaks and valleys 121E can extend in both the longitudinal and cross directions on the pre-crimped component 120. It is also possible to form single peaks 121F as shown in FIG. 22 that extend across the component 120', similar to that shown in FIG. 18. This is accomplished by providing a texture forming bump 158, 168 at the peak of the gear teeth 154, 164 which meshes with a groove 157, 167 in the opposing recess 155, 165 of both gears 150, 160, which are preferably complementary to one another in order to press and plastically deform the raw material 40 into the desired shape during crimping. Any combination of the above-described features can also be utilized in order to impart a desired surface texture characteristic to the pre-crimped component 120. This can be especially useful for creating an industrial fabric with a desired texture for applications such as papermaking wherein such a fabric could impart a desired texture or decorative pattern on a web of paper or, through the use of shaped projections, perforate the paper sheet being carried. Other applications of the textured surface are to reduce the boundary layer of air carried with the fabric when it is used as a belt.

Figure 23:
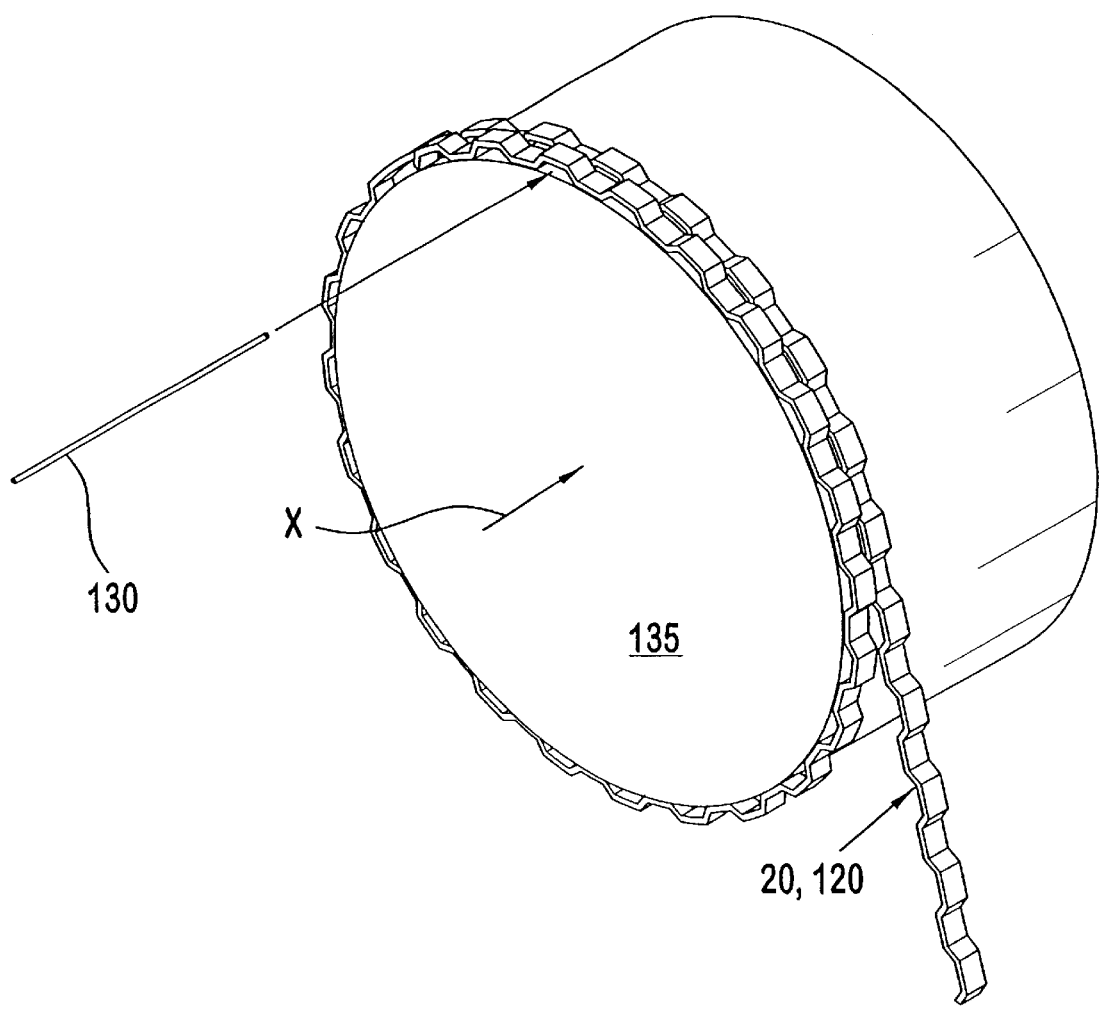
FIG. 23 is a perspective view of a mandrel being used to wind a single crimped component for formation of a tube or belt structure.
Figure 24:
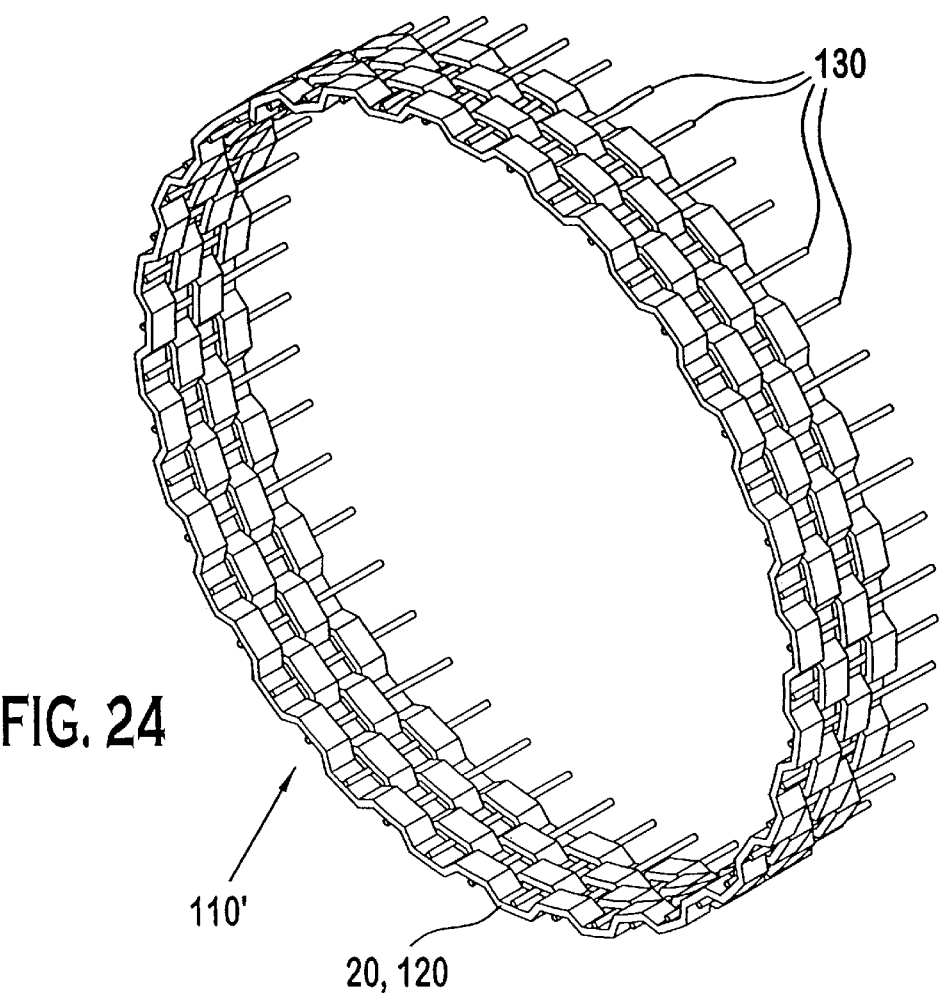
FIG. 24 is a perspective view similar to FIG. 23 of a tube or belt structure formed from a crimped component in accordance with the present invention.

Referring now to FIGS. 23 and 24, the pre-crimped components 20, 120 can also be utilized to make a tube or belt construction 110'. As shown in FIG. 23, preferably at least one pre-crimped component 20, 120 is wound around a mandrel 135 of the desired size. This may be accomplished by rotating the mandrel 135 about its axis X. The mandrel 135 is sized such that the crimp locations of adjacent portions of the pre-crimped component 20, 120 are offset by one crimp length so that a channel is formed between the crimp indentations allowing for the insertion of one or more cross-direction components 130. The horizontal or cross-direction components 130 are preferably formed from one or more polymeric yarns which act to lock together the tube or belt 110' into a stable structure as shown in FIG. 24. Depending on the size of the tube or belt 110', a single cross-direction component 130 can be used which is woven back and forth through the channels defined by the pre-crimped yarn. This can also be accomplished in an endless weaving process in which the cross-direction components 130 are the warp threads and the pre-crimped component 120 is the weft thread. Such tubes or belts can have many applications, for example, such as protective sleeves, industrial tubes, filters, drive belts, conveyor belts, tubes for concrete forms, etc.

Figure 25:
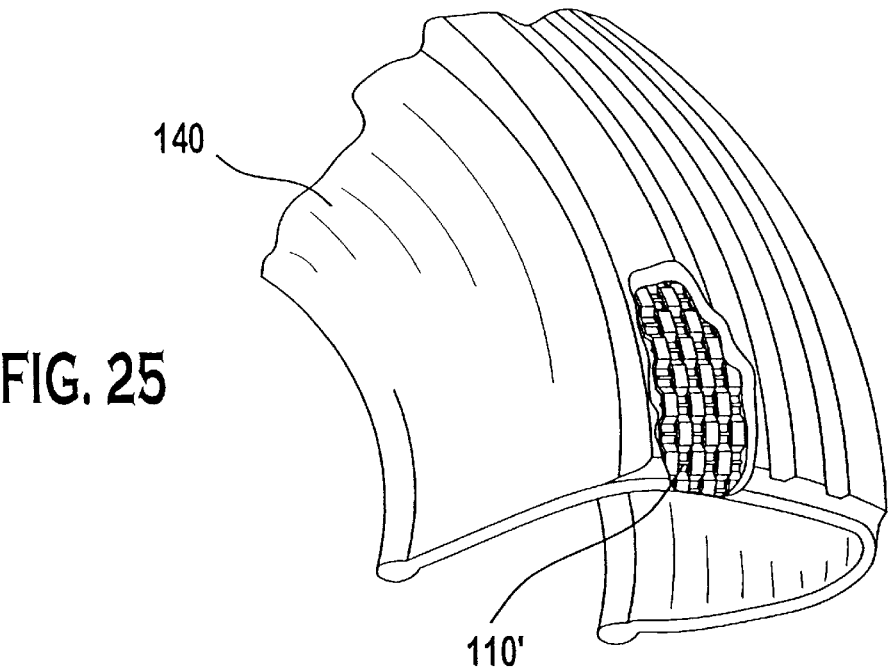
FIG. 25 is a perspective view, partially broken away, of a tire having belting formed from an assembled belt utilizing crimped components in accordance with the present invention.

Referring now to FIG. 25, another application for a belt 110' is for use as cords or belting in a tire 140 in place of the known woven steel belting. The endless belt 110' can have a textured surface and be made of a polymeric material. This along with the possible use of a cross-linking agent can allow for better adhesion between the rubber and the belt 110'. Preferably, the belt 110' is made from Kevlar or other high strength polymers, which allows for the production of a lighter, more durable tire 140. The belt can be assembled using the mandrel and by inserting a single or multiple cross-direction components, as described above.

It is also within the scope of the present invention to form sleeves 110' by braiding the pre-crimped yarns 20, 120. Relatively large diameter yarns which were previously not amenable to braiding due to the limitations of the braiding mechanism (i.e. the yarns could not be crimped) may now be braided together if the larger yarns are pre-crimped. During the braiding process, the cross-overs can be indexed to the indentations and thus will secure the braid to produce a very high strength sleeve. It is possible in this manner to form sleeves for protecting wiring, larger cables, piping and other comparatively small diameter structures, and straps to either hold larger items in place and prevent their movement, or for other uses such as belting. The pitch (ie. lateral displacement along the length of the yarn) of the indentations in the yarn are located, or indexed, such that the yarn cross-overs fall into the indentations and thus hold the yarn securely. This could also be used to produce very high strength and large diameter ropes using large, pre-crimped monofilaments. This would be useful in marine applications, or any field where a high tensile strength rope might be required.

Based on the use of pre-crimping, it is also be possible to use polymers that produce relatively inflexible yarns, such as PPS (polyphenylene sulfide) and other brittle materials that were not previously used in such applications due to their brittleness. These can now also be more easily handled in braiding and weaving equipment. This material is known for its ability to resist high temperatures, but until recently it has been very difficult to weave without breaking warp ends. By pre-crimping yarns formed from these types of difficult to handle polymers, they can now be assembled into stable, cohesive textile structures without having to crimp the yarns during their assembly, as by weaving for example.

The resultant industrial articles are generally dimensionally stable and may, if desired, utilize components having relatively larger dimensions than those currently employed in normal industrial weaving and braiding processes due to limitations imposed by the loom capacity (i.e. free fall or dead blow weight required to jam the horizontal yarns into the warp), weaving tensions and heat setting conditions currently required to impart sufficient crimp to the yarns so as to render the resulting fabric stable. Textiles may also be made from components which may not have been suitable before, for example, materials that resist deformation and the imparting of permanent crimp, such as nylon 6/6 or polyphenylene sulphide (PPS).

Textiles assembled according to the teachings of the present invention are generally more dimensionally stable, are stiffer in the cross-machine direction, and are more economical to manufacture than comparable fabrics woven without pre-crimping the components. Due to the robust nature of the components that may now be employed, such fabrics are also more resistant to compaction and crushing, due to their bulk, than has previously been possible.

It is also possible in connection with any textiles, to utilize the pre-crimped components 20, 120 as plied monofilament stuffers. Two or more pre-crimped components 20, 120 are plied together and used to stuff a woven or spiral link fabric. By pre-crimping the components 20, 120, which are preferably monofilament yarns prior to twisting or plying them together, the individual yarns will index together and not come apart. If the spacing of the indentations is close to the width of the yarn, a positive lock will occur. It is also possible to ply or twist 3 or 4 strands together by changing the spacing of the indentations on the 3rd and 4th strands and imparting a Z twist to them, and an S twist to the other pair, the two plied yarns can then be twisted together and the larger spacing of the second twisted pair will index with the first plied yarn pair, thus locking the entire plied structure together. Pairs of plied monofilaments could be used to "stuff" both spiral and woven fabrics to reduce their permeability.

Figure 26:
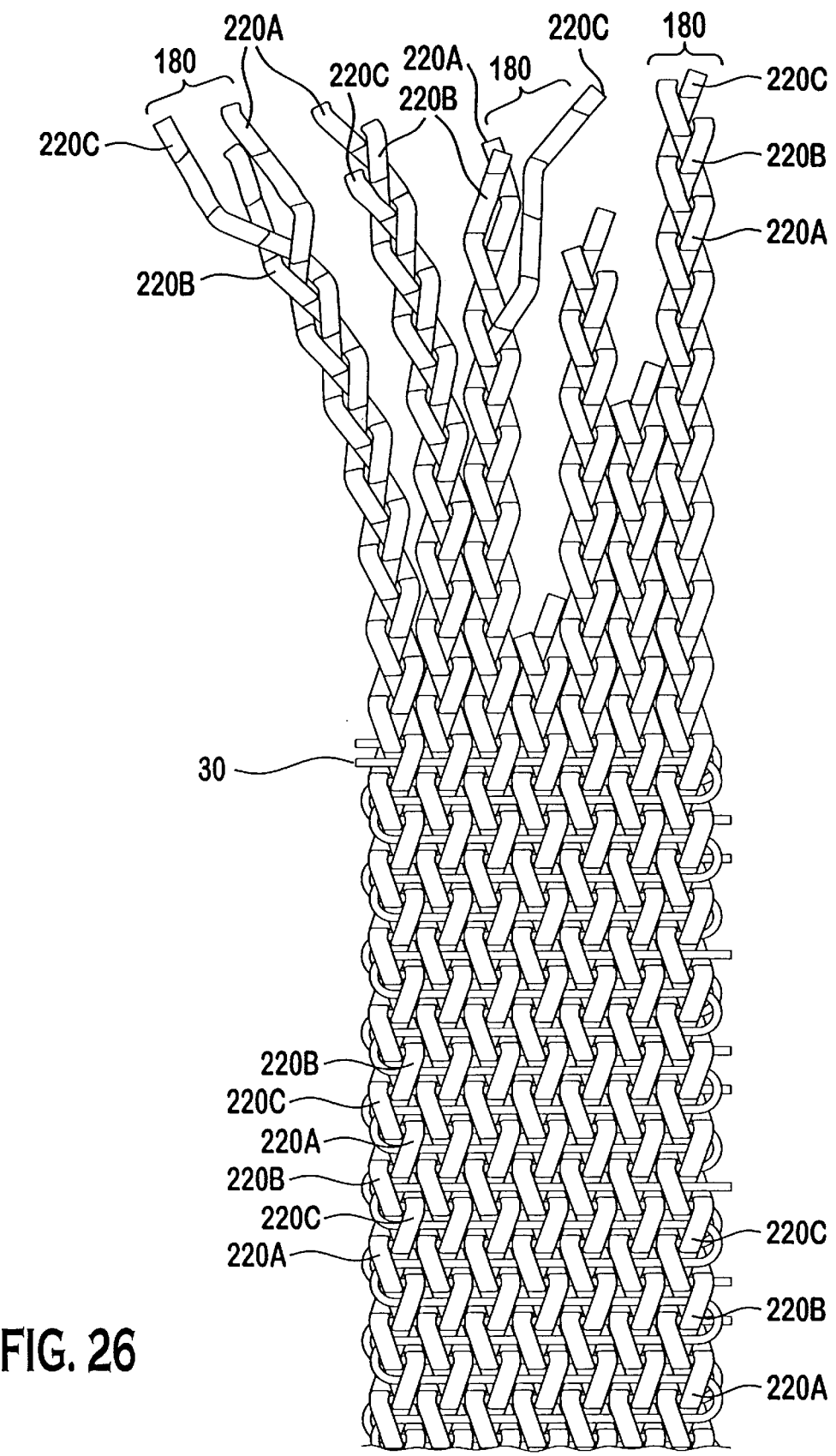
FIG. 26 is a plan view of a fabric assembled from braided crimped components.
Figure 27:
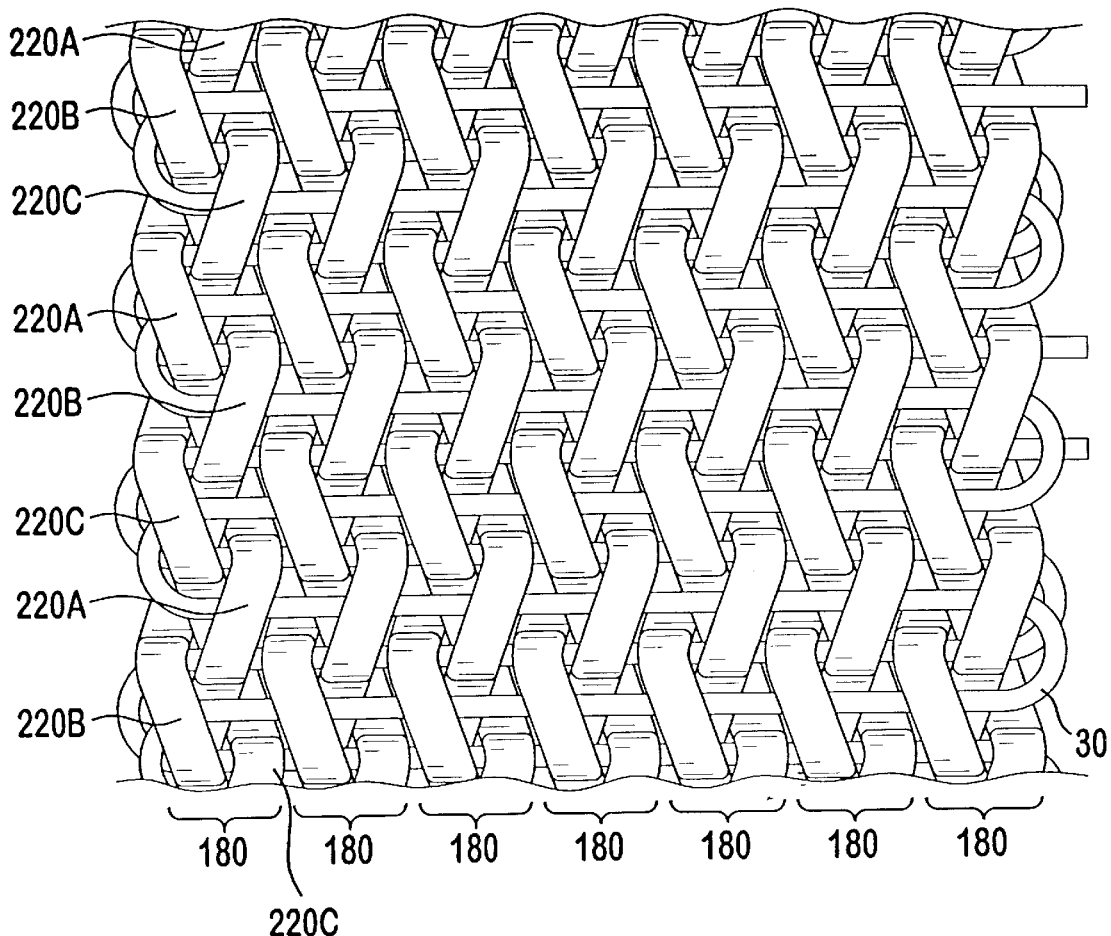
FIG. 27 is an enlarged view of the fabric of FIG. 26.

Referring now to FIGS. 26 and 27, braids 180 of pre-crimped component 220A, 220B, 220C are shown which have been assembled to form a fabric 210. The braids 180 are each formed from three separate pre-crimped components 220A, 220B, 220C which are interlocked together via the crimp indentations. The pre-crimped components 220A, 220B, 220C may be the same or similar to the components 20, 120 described above. While the braids 180 are illustrated with three pre-crimped components 220A, 220B, 220C more could be utilized if desired. The fabric 210 is assembled by inserting a horizontal or cross-direction component 30, which is preferably in the form of a monofilament yarn. The braids 180 are aligned so that the cross-direction openings are indexed so as to receive the cross-direction yarn 30.

While the present invention has been described in terms of the preferred embodiments, those skilled in the art will recognize that other changes and modifications can be made within the spirit and scope of the present invention, as defined by the appended claims.

What is claimed is:

1. An industrial textile comprising interconnected longitudinal and horizontal components, at least a portion of the longitudinal and/or horizontal components are formed of a polymeric material, the longitudinal components are pre-crimped so as to provide a plurality of bottom side indentations and top side indentations extending over an entire length thereof, the indentations formed by the pre-crimping are substantially complementary to a cross-sectional size of the horizontal components thereby allowing the horizontal components to be received and secured into position in the assembled fabric without further substantial deformation of the longitudinal components.

2. The industrial textile according to claim 1 wherein the longitudinal components are warp yarns and the horizontal components are weft yarns.

3. The industrial textile according to claim 1 wherein the longitudinal components are machine direction yarns and the horizontal components are cross-machine direction yarns.

4. The industrial textile of claim 1 wherein the longitudinal components that have the plurality of preformed bottom and top side indentations is oriented into adjacent loops, and the horizontal components are located in the horizontally extending indentations to form a tubular sleeve.

5. The textile according to claim 1 wherein the components are monofilaments.

6. The textile according to claim 1 wherein the components are multifilaments.

7. The textile according to claim 1 wherein the components are strips slit from a roll of polymeric film.

8. The textile according to claim 1 wherein all of the longitudinal components include a plurality of preformed indentations.

9. The textile according to claim 1 wherein at least a portion of the horizontal components include a plurality of preformed, longitudinally oriented indentations.

10. The textile according to claim 1 wherein each horizontal component has a given configuration and each indentation has a complementary configuration.

11. The textile according to claim 1 wherein each indentation is configured to receive at least one horizontal component.

12. The textile according to claim 1 wherein the plurality of indentations along a given longitudinal component comprises at least two subsets of indentations, each subset having a distinct configuration.

13. The textile according to claim 1 wherein the textile is a papermaking fabric.

14. The textile according to claim 13 wherein the textile is a dryer fabric for use in the dryer section of a papermaking machine.

15. The textile according to claim 13 wherein the textile is a press felt for use in the press section of a papermaking machine.

16. The textile according to claim 13 wherein the textile is a forming fabric for use in the forming section of a papermaking machine.

17. The textile according to claim 1 wherein the textile is a filtration fabric.

18. The textile according to claim 1 wherein the textile is an assembly of braided longitudinal components and horizontal components.

19. A method of manufacturing a textile fabric including the steps of:
   a) providing a plurality of longitudinal components;
   b) imparting a plurality of preformed, horizontally oriented bottom side indentations and top side indentations along the longitudinal components by pre-crimping extending over an entire length thereof, the indentations formed by the pre-crimping are substantially complementary to a cross-sectional size of the horizontal components thereby allowing the horizontal components to be received and secured into position in the assembled fabric;
   c) interlacing the longitudinal components with a plurality of horizontal components such that select horizontal components are received in and secured by the indentations without further substantial deformation of the longitudinal components.

20. The method according to claim 19 further comprising the step of imparting a plurality of preformed, longitudinally oriented indentations in select horizontal components before performing step c).

* * * * *

UNITED STATES PATENT AND TRADEMARK OFFICE
CERTIFICATE OF CORRECTION

PATENT NO.   : 6,722,394 B2
DATED        : April 20, 2004
INVENTOR(S)  : Harrison et al.

It is certified that error appears in the above-identified patent and that said Letters Patent is hereby corrected as shown below:

Title page,
Item [73], Assignee, delete "Asten Johnson" and insert therefor -- AstenJohnson --

Column 1,
Line 5, after "Apr. 3, 2000" delete "which" and insert therefor -- and --.

Column 2,
Line 47, after the first instance of the word "it", insert -- to --.
Line 51, after the word "case", delete "requiring" and insert therefor -- requires --.

Column 5,
Line 64, after "50º", delete "C." and insert therefor -- C --.
Line 64, after "250º", delete "C." and insert therefor -- C --.

Column 7,
Line 17, after the word "can", delete "the" and insert therefor -- then --.
Line 28, after the word "having", delete "a" and insert therefor -- an --.
Line 31, after the word "therewith", delete "the".

Column 9,
Line 41, after the word "also", delete "be".

Signed and Sealed this

Seventeenth Day of August, 2004

JON W. DUDAS
*Acting Director of the United States Patent and Trademark Office*